United States Patent

Bachner et al.

[11] 4,248,319
[45] Feb. 3, 1981

[54] CIRCUIT ARRANGEMENT FOR CONNECTING AT LEAST TWO TELEPRINTERS TO A COMMON CONNECTION LINE

[75] Inventors: Alfred Bachner, Groebenzell; Herbert Vogl, Munich, both of Fed. Rep. of Germany

[73] Assignee: Siemens Aktiengesellschaft, Berlin & Munich, Fed. Rep. of Germany

[21] Appl. No.: 44,059

[22] Filed: May 31, 1979

[51] Int. Cl.³ .......................................... H04L 15/00
[52] U.S. Cl. .......................................................... 178/3
[58] Field of Search ............... 178/2 R, 2 A, 2 B, 2 C, 178/2 D, 2 E, 3, 30, 26 R; 179/2 DP; 340/147 R

[56] References Cited

U.S. PATENT DOCUMENTS

| 3,798,598 | 3/1974 | Tambert et al. | 178/2 R |
| 3,958,088 | 5/1976 | Vieri | 178/3 |

*Primary Examiner*—Thomas A. Robinson
*Attorney, Agent, or Firm*—Hill, Van Santen, Steadman, Chiara & Simpson

[57] ABSTRACT

An apparatus for connecting a selected one of two teleprinters to a common communication line includes a control unit associated with each teleprinter and an analysis circuit connected to both control units and to the common line through a line interface unit. The analysis circuit can sense an incoming teleprinter selection code and connect the selected teleprinter to the common line. Alternately, the analysis circuit can sense a teleprinter originated communication and connect that teleprinter to the communication line.

8 Claims, 5 Drawing Figures

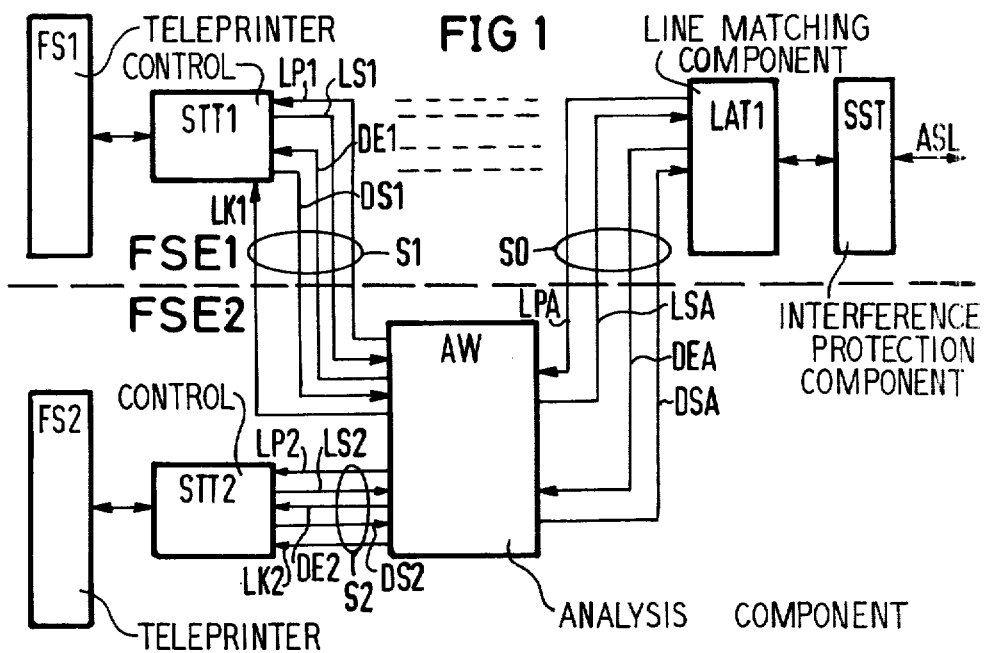
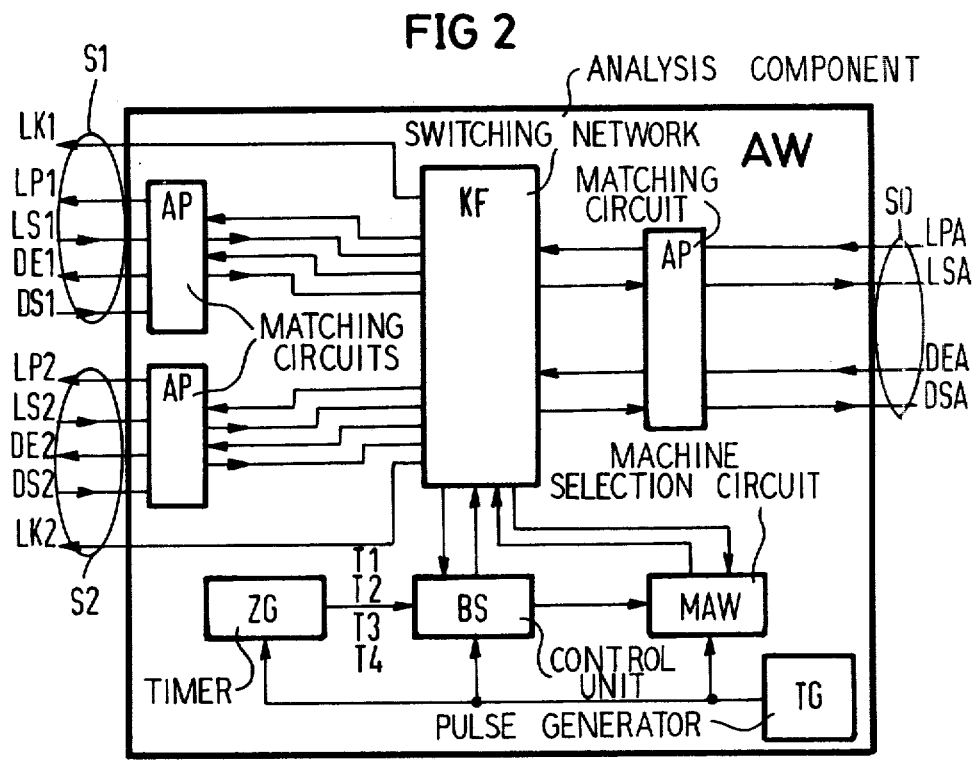

CIRCUIT ARRANGEMENT FOR CONNECTING AT LEAST TWO TELEPRINTERS TO A COMMON CONNECTION LINE

FIELD OF THE INVENTION

The invention relates to a circuit arrangement for selectively connecting one of at least two teleprinters to a common connection line, with a control component which is assigned to each teleprinter and with a line matching component which serves to evaluate the changes in state which occur on the connection line in the incoming direction and which serves to set up the changes in state which are to be transmitted via the connection line.

BACKGROUND OF THE INVENTION

The world wide use of teleprinter technology necessitates teleprinters for many different types of script. Thus, teleprinters are known for Latin and for Arabic script. However, situations also occur which require the common use of teleprinters for different scripts. In this case, both teleprinters must be able to be connected to the teleprinter network via a common connection line and this connection is to be carried out selectively in order to facilitate a connection to the one or to the other teleprinter. It is known to provide devices which are referred to as so-called remote switching devices or recently so-called remote switching units to connect teleprinters to the connection line which leads to the actual exchange. A known remote switching unit (German AS 2 36 635) comprises a control component and a line matching component. The control component can assume the functions of known remote switching devices. In the line matching component on the one hand the states prevailing on the connection line are evaluated to form criteria which are forwarded to the control component; on the other hand, as a result of the evaluation of the criteria formed in the control component, the states on the connection line are changed. Although a remote switching unit of this kind advantageously permits adaptation to many different processes of transmission on the connection line and the connected terminal devices are themselves not subject to any special requirements, this known arrangement is not suitable for the connection of a plurality of terminal devices to which random access is to be provided. The quoted AS 2 36 635 does, in fact, disclose a possibility of connecting an additional device, but this arrangement only permits monitoring operation.

SUMMARY OF THE INVENTION

The aim of the invention is to provide an arrangement for connecting one of two teleprinters to a common connection line wherein the one or the other teleprinter can be selectively connected to the connection line both in the outgoing and in the incoming direction, and wherein furthermore, the operating properties of the particular teleprinter which is not connected are not influenced in the case of local operation.

This aim is achieved in a manner hereinafter described.

The advantages of the circuit arrangement in accordance with the invention consist in particular in that only one teleprinter is at any time involved in line operation and even when the one teleprinter is connected, the other can continue undisturbed in local operation. Moreover, the arrangement can be inserted and removed from existing installations at any time in the form of a special assembly without a considerable outlay. No modifications are required in the relatively elaborate control component of a remote switching unit.

BRIEF DESCRIPTION OF THE DRAWINGS

The invention will be explained in the following, making reference to the drawings, in which:

FIG. 1 illustrates an exemplary embodiment of the connection technique for two teleprinters in the form of a block circuit diagram;

FIG. 2 shows details of an analysis unit;

DETAILED DESCRIPTION OF A PREFERRED EMBODIMENT

Figure 3:
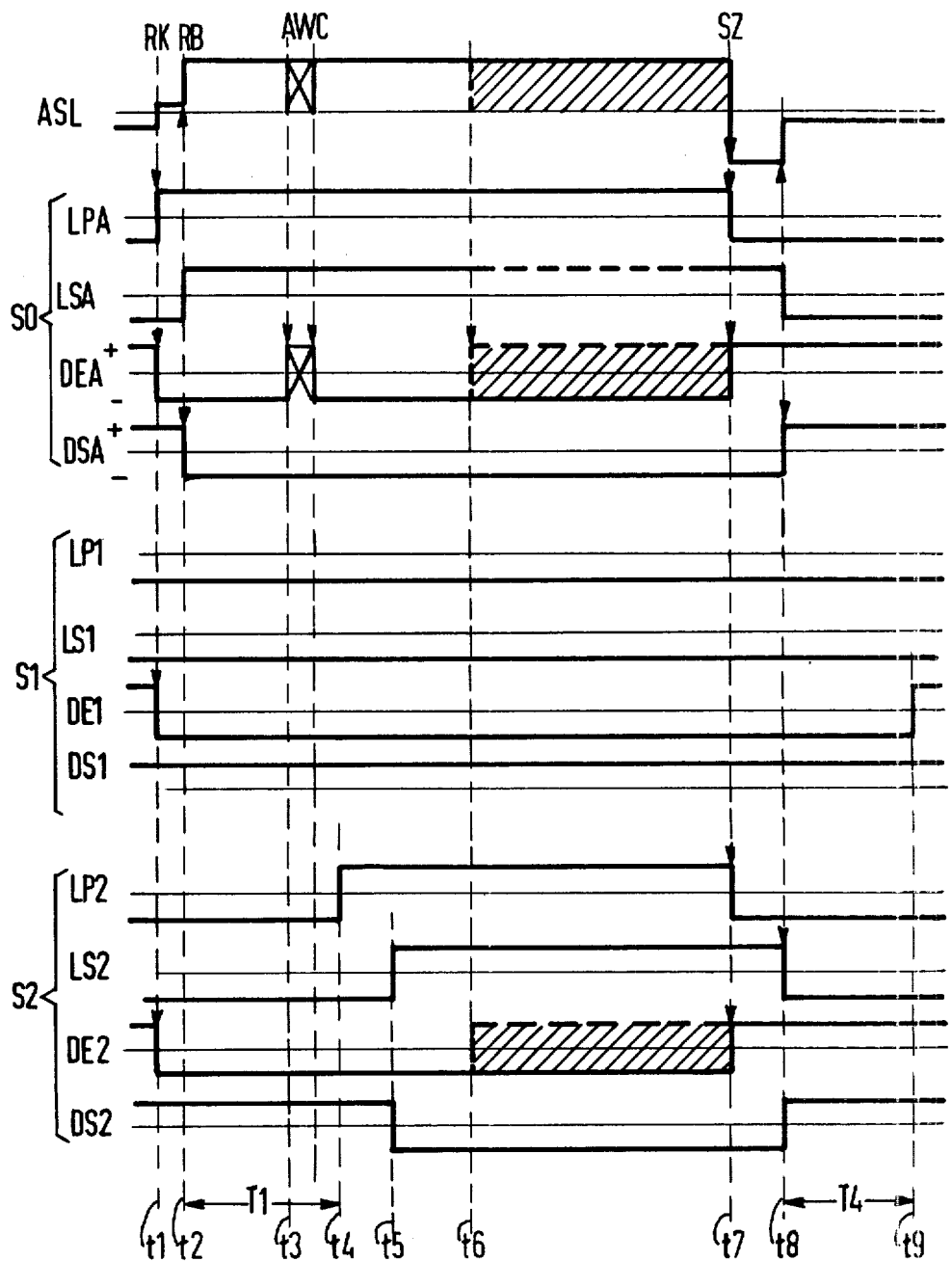
FIG. 3 shows the signalling flow in the case of an incoming seizure and a clearing criterion emanating from the exchange.

The exemplary embodiment illustrated in FIG. 1 diagrammatically shows, on the left hand side, two teleprinters FS1 and FS2, one of which is provided, for example, for Latin script and the other of which is provided for Arabic script. Each teleprinter is assigned a remote switching unit FSE1 and FSE2, of which the remote switching unit FSE1 is constructed in a known manner. It contains a control component STT1 and a line matching component LAT1, and an interference protection component SST which is arranged between the line matching component LAT1 and the connection line ASL which is common to the two teleprinters. The interface lines S0 of the line matching component LAT1 are connected to the inputs of an analysis component AW which forms part of the remote switching unit FSE2 assigned to the second teleprinter FS2. The second remote switching unit FSE2 likewise contains a control component STT2 which corresponds to the control component STT1 in the remote switching unit FSE1 in respect of its construction and mode of operation. The analysis component AW is connected to the two control components STT1 and STT2 via the interface lines S1 and S2. Each interface S0, S1 and S2 comprises four lines, namely a line (LP ...) which serves to transmit a criterion corresponding to the polarity of the connection line, a line (LS ...) which serves to transmit a criterion which sets up the current on the connection line, a line (DE ...) which serves to transmit received data incoming via the connection line and a line (DS ...) which serves to transmit the transmitted data to be transmitted on the connection line. The interface lines S1 and S2 also each comprise a connection line LK1 and LK2 which transmit a criterion for the enforced disconnection of local operation which is in progress. The interface lines S0 are individually referenced LPA, LSA, DEA and DSA, whereas the interface lines S1 are individually referenced LP1, LS1, DE1, DS1 and LK1, and the interface lines S2 are individually referenced LP2, LS2, DE2, DS2 and LK2. The criteria for the control components STT1 and STT2 are formed in the line matching component LAT1 of the remote switching unit FSE1 by evaluating the states prevailing on the connection line ASL. The corresponding criterion for the line polarity is transmitted to the analysis component AW via the line LPA and the criteria corresponding to the received data are transmitted to the analysis component AW via the line DEA. Furthermore, in the matching component LAT1, the states prevailing on the connection line ASL are changed by evaluating the criteria emanating from the control components STT1 and STT2 and from the analysis component AW, where the criterion for changing the line current is transmitted via the line LSA, and the criteria corresponding to the data to be transmitted are transmitted via the line DSA from the analysis component AW to the line matching component LAT1. The criteria arriving via the lines LPA and DEA are forwarded to the control components STT1 and STT2, via the lines LP1, DE1 and LP2, DE2. The transmission of the criteria from the control components STT1 and STT2 to the analysis component AW is carried out via the lines LS1, DS1, and LS2, DS2. The interface lines S0 and S1 can be of a plug-in design in the same way as the broken-line connections between the control component STT1 and the line matching component LAT1 so that it is possible to change over to operation with one single teleprinter as and when required without a noticeable outlay.

The analysis component AW provided in accordance with the invention, and the connection thereof to the line matching component LAT1 via the interface lines S0 and to the control components STT1 and STT2 via the interface lines S1 and S2 facilitates a simple means of selecting and connecting one of the two teleprinters FS1 and FS2.

Reference will now be made to FIG. 2 in explanation of further details. The analysis component AW illustrated therein contains a switching network KF to which the interface lines S0, S1 and S2 are connected via matching circuits AP. These matching circuits AP fundamentally serve to carry out a conversion to the level provided for the elements of the analysis component. The switching network KF can be controlled via an operating control unit BS and via a machine selection circuit MAW. The machine selection circuit MAW evaluates a criterion which has been agreed upon to represent the connection of one of the two teleprinters, for example, a specific sequence of letters. The analysis component AW also contains a timer ZG which, in association with the operating control unit BS, supplies the monitoring times required for the evaluation of the prevailing signalling states. Timer ZG, operating control unit BS and machine selection circuit MAW are supplied with the pulse trains of a common pulse generator TG. The switching network KF can consist, for example, of a gate logic via which the interface lines S1 or S2 are connected to the interface lines S0. The operating control unit BS contains a series of trigger stages which (not shown here) can be controlled in accordance with the criteria offered via the interface lines S0, S1 and S2 and which determine the rest state, printing state, clearing state, and calling state in the case of an incoming seizure. During the rest state of the analysis component AW, the line LPA and the data transmitting lines DS1 and DS2 are merely monitored. In this case, there is no switch-through between the individual interface lines via the switching network KF. The occurrence of a connection request emanating from a teleprinter FS1 or FS2, thus an outgoing seizure, is recognized by the evaluation of the call criterion in the analysis component AW where it leads to a transition from the rest state to the printing state. In dependence upon the machine selection circuit MAW in the switching network KF, the interface lines S1 or S2 of the control component STT1 or STT2 assigned to the calling teleprinter FS1 or FS2 respectively are connected to the interface lines S0. Whereas, in the case of an outgoing call, the selection of the teleprinter making the connection request can be easily determined by evaluating the corresponding call criterion on one of the lines LS1 or LS2 in combination with the state of the data transmitting line DS1 or DS2, in the event of an incoming call it is also necessary to evaluate a selection code before establishing the printing state. This selection code is transmitted across the connection line from the exchange following a call confirmation and is evaluated in the machine selection circuit MAW. This is carried out within a monitoring time which is governed by the timer ZG and which is started following the transmission of the call confirmation criterion which serves to confirm the reception of an incoming call signal via the line LPA. In this case, the switching network KF is set up via which the interface lines S0 are now connected to the interface lines S1 or S2 of the selected teleprinter, although only after the expiration of the time provided for the reception of the selection code. Following the arrival of a seizure confirmation criterion from the required teleprinter, the analysis component AW now also assumes the printing state. Simultaneously to the switch-through of the connection across the switching network KF, a further monitoring time is started in the timer ZG. In the event that the selected teleprinter is engaged in local operation and is unable to immediately confirm its seizure, following the start of this monitoring time, a criterion is transmitted via the control line LK1, LK2 to the control component STT1, STT2 assigned to the selected teleprinter FS1, FS2 and serves to enforceably disconnect the local operation therein. If no further seizure confirmation criterion arrives following the transmission of this criterion, the partially established connection is cleared.

A connection remains switched through via the switching network KF in the analysis component AW until the arrival of a clearing criterion in which case the analysis component AW is no longer required to carry out any control functions. These are now handled in a known manner between the control component assigned to the selected teleprinter and the line matching component. The cooperation of the analysis component AW does not commence until the end of a communications transmission. For this purpose, the line LPA and the data receiving line DSA, within the interface lines S0, the lines LS1, LS2 and the data transmitting lines DS1 and DS2 within the interface lines S1 and S2 in the operation control unit DS of the analysis component AW are monitored in respect of the states corresponding to a clearing criterion which has been agreed upon as a clearing signal. A clearing signal which arrives via the connection line ASL and which serves to change the line polarity prevailing on the connection line ASL leads, in the line matching component LAT1, to the formation of a criterion on the line LPA and on the data receiving line DEA. A clearing signal which has been formed as a result of the actuation of the clearing key in the selected teleprinter leads, via the assigned control component, to the transmission of a criterion on the line LS1, LS2 and on the data transmitting line DS1, DS2. The evaluation switching means which are provided in the operating control unit BS—preferably trigger stages—are reversed in accordance with these criteria and allow these criteria to be forwarded via the ongoing interface lines. In the event that a clearing signal arrives via the connection line ASL1, via the analysis component AW a polarity change criterion is transmitted across the lines LP1 or LP2 and the data receiving lines DE1 or DE2 are poled. In the event that a clearing signal arrives from a teleprinter, this is forwarded via the analysis component AW on the line LSA and the data transmitting line DSA.

In order to ensure the prescribed time of protection from a new outgoing seizure following the clearance of a connection, after the repoling of the connection line ASL and the assumption of the rest state by the teleprinter connected via the switching network KF, the timer ZG is always switched on and a further monitoring time provided for the clearance state is commenced. This ensures that the previously non-connected teleprinter is not released for a new outgoing seizure until the end of this monitoring time.

Figure 4:
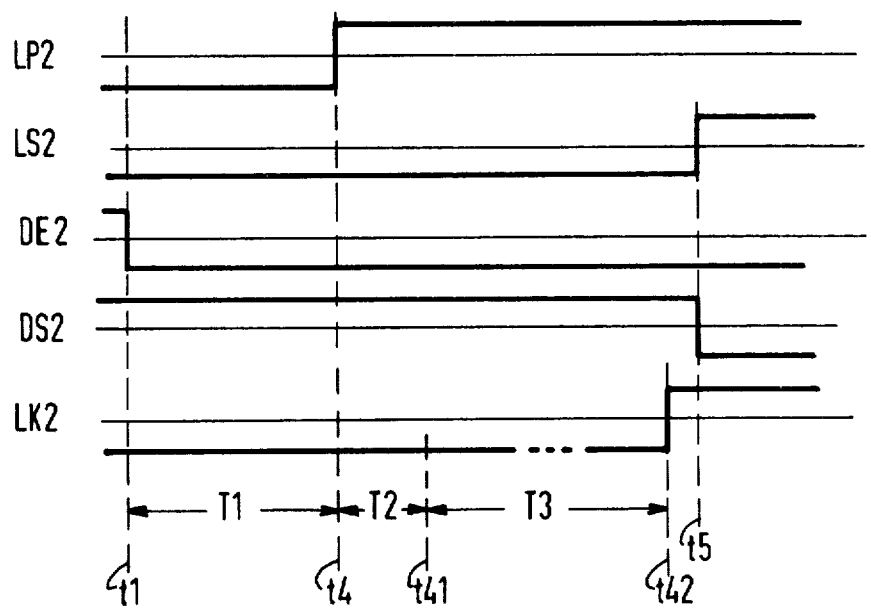
FIG. 4 shows the flow for interrupting local operation in a selected teleprinter.
Figure 5:
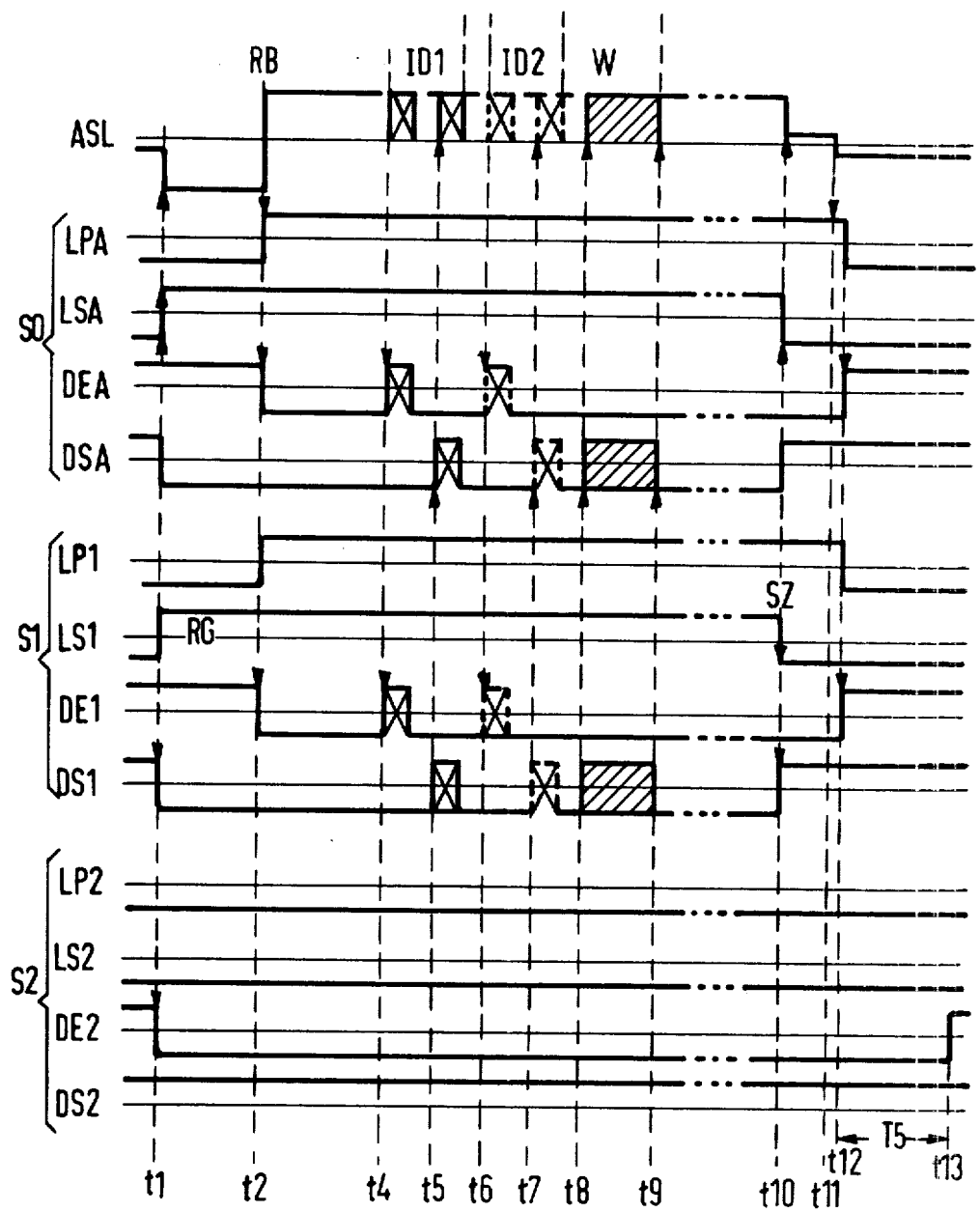
FIG. 5 illustrates the signalling flow in the case of an outgoing seizure and the clearance of the connection by the calling subscriber.

In the following, the mode of operation of the circuit arrangement shown in FIGS. 3, 4 and 5 will be explained in examples of two typical signal flows.

First, making reference to FIG. 3, the procedures which occur in the event of an incoming seizure and in the event of a clearing criterion incoming via the connection line will be described. The first line illustrates the state prevailing on the connection line ASL, and the following lines illustrate the states prevailing on the interface lines S0, S1 and S2. The references of the individual lines within the interface lines S0, S1 and S2 correspond to those used in FIGS. 1 and 2.

It will be assumed that at the time t1 a call criterion RK arrives on the line ASL. In accordance with a signalling process which has been assumed in this example, the connection line ASL is reversed in polarity (from $-5$ mA to $+5$ mA). This polarity reversal is recognized in the line matching component LAT 1 and transmitted to the analysis component AW via the line LPA within the interface lines S0. The analysis component is thus brought into the call state for an incoming seizure, in which the two control components STT1 and STT2 are blocked from an outgoing seizure. In the example, this is carried out by reversing the polarity of the data receiving lines DE1 and DE2. Then, for example, after approximately 10 ms at the time t2, the analysis component AW forms the call confirmation criterion RB. For this purpose, the line LSA is switched on and the data transmitting line DSA is reversed in polarity. As a result, an item of information to increase the current ($+40$ mA) on the connection line ASL is formed in the line matching component LAT1. At the same time the machine selection circuit and the timer are released in the analysis component AW. Within a first monitoring time T1, which is determined by the timer and amounts, for example, to approximately 600 ms, the data receiving line DEA is monitored for the arrival of a selection code AWC. This selection code can, for example, consist of a specific combination of letters which is provided for the connection of one of the two teleprinters, in the example illustrated in FIG. 3 for the connection of the teleprinter FS2. It will now be assumed that this selection code arrives via the connection line ASL at the time t3, thus within the first monitoring time T1, from where it passes via the line matching component and the data receiving line DEA to the analysis component. The outcome of the evaluation of the selection code AWC is that, on the expiration of the first monitoring time T1, under the control of the machine selection circuit, the line LP2 which leads to the control component of the selected teleprinter is switched on and the call criterion is also communicated to this control component. This is carried out at the time t4. Successful seizure is confirmed by the selected control component by the connection of the line LS2 which takes place at the time t5. Simultaneously, the data transmitting line DS2 which connects the analysis component to the selected control component is reversed in polarity. The analysis component assumes the printing state and now connects the interface lines S2 to the interface lines S0. Thus, a connection is switched through between the connection line, the line matching component, the control component and the selected teleprinter. All the other control processes such as, for example, the exchange of further identification characteristics between the selected teleprinter and the exchange, are carried out between the control unit assigned to the selected teleprinter and the exchange. This also applies to the transmission of the actual item of communication. The analysis component is no longer actively participating in these procedures. However, the non-selected teleprinter is blocked in the outgoing direction for the entire connection. For this purpose, the data receiving line DE1 remains in the unpoled state for this length of time.

If the selection criterion AWC does not arrive within the provided first monitoring time T1, this is considered as a criterion that the other teleprinter, in the example, the teleprinter FS1, is to be connected. Under these conditions, the described procedure takes place in the same way, although now the interface lines S1 are switched through and reversed in polarity at the given time and the connection is established by switching through the interface lines S1 and S0. At the time t6, the switch-through of the incoming connection to the selected teleprinter is established. The exchange of communications takes place in the conventional manner between the times t6 and t7. The non-selected teleprinter can carry out local operation undisturbed during this period of time.

The arrival of a clearing signal SZ in the form of a reversal of polarity on the connection line ASL (from $+40$ mA to $-40$ mA) signals the clearing criterion. In the line matching component LAT1, the clearing signal SZ is recognized as a change in state and leads to the connection of the line LPA. As a result, the data receiving lines DEA and DE2 are also reversed in polarity. Simultaneously, the line LP2 which leads to the control component of the selected teleprinter is disconnected, and as a result, following a short reaction time, at the time t8, the lines LS2 are disconnected and the data transmitting lines DS2 are reversed in polarity. Via the analysis component, this leads to the disconnection of the line LSA and a reversal of polarity on the data transmitting line DSA. Initially, the connection remains switched through via the switching network in the analysis component. The disconnection of the line LSA at the time t8 leads, via the line matching component, to the setting up of the rest current on the connection line ASL. In order to prevent a seizure by the non-connected teleprinter within the protection period which is provided for switching systems, and which ensures that the exchange is not re-seized, there is provided a fourth monitoring time T4 on the expiration of which the switch-through of the connection across the switching network is discontinued and, as a result, the data receiving line DE1 which leads to the control unit of the previously non-connected teleprinter is reversed in polarity. This takes place at the time t9. Until this time, the non-connected teleprinter is blocked in respect of an outgoing seizure.

If, on the arrival of a seizure criterion, communicated by the connection of the line LP1 or LP2, a selected teleprinter is involved in local operation, the seizure-confirmation criterion which is formed by the connection of the line LS1 or LS2, does not arrive in the analysis component within the given second monitoring time T2. In this case, a third monitoring time is started, on the expiration of which the local operation is enforceably terminated. Details of this procedure are illustrated in FIG. 4, in which, commencing from the example selected in FIG. 3, it has been assumed that following the expiration of the first monitoring time T1 at the time t4, the control component of the selected teleprinter is supplied with the seizure criterion as a result of the connection of the line LP2, and that within the given second monitoring time T2, which can amount, for example, to 140 ms, a confirmation criterion of this seizure does not arrive. Therefore, at the time t41, the third monitoring time T3 commences which, for example, can amount to 1.4 s. If the confirmation criterion for the seizure does not arrive in the analysis component by the end of this third monitoring time T3, at the time t42 the control line LK2 is connected and local operation is enforceably terminated in the selected teleprinter. Following a short reaction time, the confirmation criterion arrives at the time t5 in which case, the line LS2 is connected, and the data transmitting line DS2 is reversed in polarity. The other procedures now follow in the manner already described with reference to FIG. 3.

The procedures involved in the case of an outgoing seizure and the clearance of a connection by the subscriber will be explained in the following, making reference to FIG. 5. Here, again, the first line illustrates the states prevailing on the connection line ASL, whereas the following lines illustrate the states prevailing on the interface lines S0, S1 and S2.

It will be assumed that at the time t1, an outgoing seizure is requested as a result of the operation of the call key in a teleprinter. The example is based upon a seizure in the teleprinter FS1. AS a result of the connection of the line LS1 and the polarity reversal of the data transmitting line DS1, the call criterion RG is, consequently, communicated to the analysis compunent where it is evaluated. Following the evaluation, the analysis component itself switches through the states prevailing on these lines to the lines LSA and DSA, leading to the line matching component, i.e., the line LSA is connected and the data transmitting line DSA is reversed in polarity. In order to block the second teleprinter in respect of an outgoing seizure, the data receiving line DE2, which leads to the control component of this teleprinter is also reversed in polarity. Via the line matching component, the connection of the line LSA is evaluated in a known manner in order to transmit the call criterion on the connection line ASL. In the case of an outgoing seizure, the analysis component already assumes the printing state at this time and releases the switch-through of the interface lines S1 to the interface lines S0. When the printing state is assumed, the control component of the calling teleprinter undertakes the remainder of the connection establishment, during which all the signals and items of information are transmitted via the switched through connection in the analysis component. This applies to the call confirmation criterion RB which arrives via the connection line ASL at the time t2 and which leads, in the line matching component, to the connection of the line LPA and a polarity reversal of the data receiving line DEA, and which is thus transmitted via the analysis component to the control component of the calling teleprinter in that the line LP1 is connected and the data receiving line DE1 is reversed in polarity. Moreover, further identification characteristics are transmitted via this switched through connection path at the times t4, t5, t6 and t7. These are required in order to inform the exchange as to which of the two teleprinters made the call request. If, for example, it is possible that the identification can be made simply by the reception of the first identification criterion ID1, the second identification characteristic ID2 is not requested. In FIG. 5, this has been shown in a broken line as the example is based upon the call of the first teleprinter. Between the times t8 and t9, the dialing information is transmitted, which is likewise fed via the switched through connection path to the line matching component and from there via the connection line ASL to the superordinate exchange. Following the establishment of the connection to a called subscriber (not shown), the exchange of information takes place.

In the illustrated example, the clearance of the connection is initiated by the actuation of the clearing key in the subscriber station. As a result, the line LS1 in the control component of the relevant teleprinter is disconnected at the time t10 and at the same time, the data transmitting line DS1 is reversed in polarity. These two criteria lead via the analysis component to the disconnection of the line LSA which leads to the line matching component and to the polarity reversal of the line DSA. This results in a reduction in current on the connection line ASL. In a known manner, the exchange forms a clearance confirmation criterion by reversing the polarity of the connection line ASL, which arrives at the time t11 and, following a reaction time, leads to the disconnection of the line LPA, which, in turn, leads to the disconnection of the line LP1 and the polarity reversal of the data receiving lines DEA and DE1. In order to prevent another premature seizure of the previously non-connected teleprinter in the outgoing direction, here the further monitoring time T4 is provided, which is started at the time t12 and on the expiration of which the data line DE2, which leads to the control component of the previously non-connected teleprinter is reversed in polarity. This concludes the clearing procedure, and the analysis component again assumes the rest state.

It will be apparent to those skilled in the art that many modifications and variations may be effected without departing from the spirit and scope of the novel concepts of the present invention.

We claim as our invention:

1. Circuit arrangement for connecting one of at least two teleprinters to a common connection line, comprising line matching means for evaluating the changes in state which occur on said connection line in the incoming direction, means for control associated with each teleprinter and adapted to generate selected call criteria, means for analysis connected in the direction leading toward said connection line, each of said means for control being connected via interface lines to said means for analysis which is connected in the direction leading toward said connection line via further interface lines to said line matching means, said line matching means including means for producing specific criteria in response to states sensed on the common connection line, and for transmitting said criteria to said means for analysis and further including means for producing changes in state on the connection line in the outgoing direction, said means for analysis including evaluation switching means for evaluating call criteria which are transmitted from said means for control and from said line matching means, for evaluating a clearing criterion received from said connection line, and for evaluating a teleprinter selection criterion, said means for analysis also including switching means which serve to switch through said interface lines and timing means which serves to form monitoring times.

2. Circuit arrangement according to claim 1, wherein, upon evaluating a call criterion transmitted from one of said means for control said means for analysis transmits said call criterion to said line matching means, and upon evaluating a call criterion transmitted from said line matching means said means for analysis transmits a call confirmation criterion to said line matching means and enables said timing means which specifies a first monitoring time wherein said means for analysis can sense a selection code, upon sensing said selection code, said means for analysis transmitting a call criterion to the selected one of said means for control and upon said means for control transmitting a seizure confirmation criteria to said means for analysis, said means for analysis criterion said respective interface lines of said selected means for control by way of said switching means to said interface lines of said line matching means.

3. Circuit arrangement as claimed in claim 2, characterized in that on the expiration of the first monitoring time, said timing means is switched on in order to specify a second monitoring time provided for the arrival of said seizure confirmation criterion.

4. Circuit arrangement as claimed in claim 1, characterized in that said timing means provides first and second monitoring times, so that during said first monitoring time one of said selection criteria can be sensed and during said second monitoring time the arrival of a seizure confirmation criterion can be sensed.

5. Circuit arrangement as claimed in claim 3, characterized in that when said seizure confirmation criterion fails to appear within said second monitoring time, said timing means is switched on in order to specify a third monitoring time on the expiration of which said means for analysis transmits a criterion to automatically disconnect local operation via an additional control line within said interface lines leading to each of said means for control.

6. Circuit arrangement as claimed in claim 4, characterized in that upon evaluating said confirmation criterion, said means for analysis switches on said timing means in order to specify a further monitoring time on the expiration of which said means for analysis cuts off the connection of said interface lines between said means for analysis and said means for control assigned to the previously non-selected teleprinter to said interface lines of said line matching means.

7. Circuit arrangement as claimed in claim 1, characterized in that said means for control assigned to one of said teleprinters and said line matching means in each case form a remote switching unit, whereas said means for control assigned to the other teleprinter and said means for analysis are each arranged within a respective one of the teleprinters, and only said remote switching unit which contains said line matching means is connected to said connection line, and that said interface lines run between said remote switching units via plug-in connection means.

8. Circuit arrangement as claimed in claim 7, characterized in that in order to enable operation of an individual machine, said interface lines associated with a respective one of said means for control are connected via said plug-in connection means to said interface lines associated with said line matching means.

* * * * *